United States Patent [19]

Loukos

[11] Patent Number: 4,685,593
[45] Date of Patent: Aug. 11, 1987

[54] FEEDER FOR HIGHLY ABRASIVE MATERIALS

[76] Inventor: Isaias Loukos, Rte. 2, P.O. Box 226 F-2, Knoxville, Md. 21758

[21] Appl. No.: 732,180

[22] Filed: May 8, 1985

[51] Int. Cl.[4] .............................................. B67D 5/64
[52] U.S. Cl. .................................. 222/168.5; 222/370
[58] Field of Search ............ 222/162, 168, 160, 168.5, 222/368, 444, 452, 450, 424.5, 362, 370, 410; 221/265, 266; 141/248, 145

[56] References Cited

U.S. PATENT DOCUMENTS

| | | | |
|---|---|---|---|
| 789,085 | 5/1905 | Dary | 141/248 |
| 1,184,074 | 5/1916 | Clark | 222/168.5 |
| 2,199,065 | 4/1940 | Bell | 222/370 |
| 2,610,646 | 9/1952 | Michaelson et al. | 222/168 |
| 2,942,761 | 6/1960 | Jungmayr | 222/162 |
| 3,101,872 | 8/1963 | Dickinson | 221/265 |
| 3,102,665 | 9/1963 | Zeiss | 222/452 |
| 3,251,511 | 5/1966 | Lloyd | 222/370 |
| 3,260,415 | 7/1966 | Minamiyama et al. | 222/162 |
| 3,265,251 | 8/1966 | Lense | 222/168.5 |
| 3,305,139 | 2/1967 | Ward | 222/168.5 |
| 3,374,811 | 3/1968 | Goosman | 141/145 |
| 3,406,871 | 10/1968 | Hoenisch | 222/168 |
| 3,648,900 | 3/1972 | Voigt | 222/168.5 |
| 3,716,167 | 2/1973 | Huntington | 222/168 |
| 4,613,058 | 9/1986 | Conger | 222/370 |

Primary Examiner—H. Grant Skaggs
Assistant Examiner—Kenneth Noland
Attorney, Agent, or Firm—Fred Wiviott

[57] ABSTRACT

A feeder for highly abrasive materials includes a housing and an impeller. The housing includes inner an outer concentric, spaced apart, vertically oriented wall portions which are each closed at their lower ends by a common bottom plate and at their upper ends, respectively, by vertically spaced apart top plates. The impeller is disposed in the gaps between the wall portions and the top plates and consists of a pair of, spaced-apart, vertically oriented cylindrical members which are joined in a concentric relation by a plurality of radially extending, equi-spaced apart fins. The fins extend upwardly from the lower edges of the cylindrical members and terminate below their upper ends to define a plurality of compartments having equal volumes. The impeller is secured at its upper end to a shaft extending downwardly through the upper-most top plate and along the impeller axis so that the impeller may be rotated to sequentially position each compartment above an opening in the bottom plate. A feed spout extends downwardly through an opening in the outer housing to a point above the upper margins of the compartments and below the level of the impeller shaft.

15 Claims, 2 Drawing Figures

FEEDER FOR HIGHLY ABRASIVE MATERIALS

BACKGROUND OF THE INVENTION

This invention relates to feeders and more particularly to feeders for handling highly abrasive materials Volumetric and gravimetric feeders have been widely used for controlling the feed rate of materials used in various industrial applications. While a wide variety of feeder types have been employed, the choice is normally governed by the properties and characteristics of the material whose feed rate is to be controlled and the requirements of the specific application. For example, the material may vary in granulometry from a few microns in particle size up to 10 or 20 millimeters or more. In addition, the material particle may be uniform in size and shape or irregular or may vary in abrasiveness. Another variable is the feed accuracy required by the specific application. In some cases, relatively accurate and uniform flow rates may be required while other applications may permit fluctuations of up to 5 or 10 percent from the nominal required value.

Examples of prior art volumetric and gravimetric feeders include Archimedean screws, multiple rotary vane and vibratory types. Various problems have been encountered in employing prior art feeders resulting from a combination of the characteristics of the material being fed and the constraints or requirements imposed by the specific application. These problems include inaccurate or irregular flow rates usually effected by changes in material granulometry or fluidity, changes of material head column at the inlet of the feeder and changes of relative pressure or air currents across the feeder in applications where the feeder is connected to processes or ducts under pressure.

Another problem with prior art feeders is the abrasion of apparatus surfaces, shaft seals and bearings where abrasive materials are handled. This problem is compounded in applications where highly accurate flow rates are required which necessitates relatively small clearances between rotating members, such as screws or vanes, and the casing of the apparatus resulting in greater abrasive action between the material and the feeder component surfaces.

Some prior art feeders are also susceptible to self-destruction by overload when the discharge material exit from the feeder is blocked. This occurs when the apparatus and drive train forces material against a dead head or blocked exit.

One application where gravimetric or volumetric feeders are employed for feeding abrasive materials at a controlled rate is in the treatment of emissions from aluminum production facilities. In particular, the production of aluminum by various well known processes generates effluent gases such as hydrogen flouride and other flouride compounds, carbon monoxide, carbon dioxide, sulfur dioxide, hydrocarbons and entrained filing divided solid particles of aluminum, carbon and other materials. These emissions are commonly vented by means of specially designed hoods and ducts to gas cleaning systems to prevent the discharge of pollutants into the atmosphere and for the recovery of valuable flouride and alumina contained in the gases.

In one well known type of emission control system, metal grade alumina is employed for the adsorption and removal of hydrogen fluoride and other fluoride compounds as well as the entrapment of hydrocarbons from gases evolved in the aluminum manufacturing process. The principle advantage of using alumina for pollution control and material recovery is that the alumina along with the recovered fluoride can readily be returned to the reduction pots or cells, for use in the aluminum recovery process.

In one type of fume treatment system, alumina is fed at a controlled rate into a horizontal or vertical duct through which the waste gases are conducted. The alumina particles are dispursed into the waste stream for the adsorption of fluorine compounds. One such apparatus for cleaning waste gases from aluminum production facilities is disclosed in U.S. application Ser. No. 470,787, filed Mar. 1, 1983, now U.S. Pat. No. 4,501,599.

One major problem in such prior art systems results from the fact that the alumina is highly abrasive. As a result, rapid wear is encountered not only in the gas cleaning system itself but in the apparatus employed for feeding alumina particles at the desired rate into the gas cleaner.

SUMMARY OF THE INVENTION

It is an object of the invention to provide a new and improved apparatus for feeding measured quantities of a highly abrasive material.

Another object of the invention is to provide a feeder for highly abrasive materials wherein the material is segregated from the apparatus drive components.

A further object of the invention is to provide a feeder for use with abrasive particles wherein abrasion of drive components is minimized.

Yet another object of the invention is to provide a volumetric feeder for highly abrasive material wherein relative movement between the material and the apparatus is minimized.

These and other objects of the present invention will become more apparent from the detailed description thereof taken with the accompanying drawings.

In general terms, the invention comprises a feeder for highly abrasive materials, which includes a housing having upper and lower wall portions. An impeller is disposed within the housing and includes means defining a plurality of compartments of equal volume and disposed in an equi-angular circular array. The compartments are disposed adjacent the lower end of the housing and are open at their upper and lower ends. The impeller also includes an upper portion disposed above the compartments and adjacent the upper wall portion of the housing. Shaft means extends downwardly through the upper wall portion and engages the upper portion of the impeller and drive means is coupled to the shaft means for rotating the impeller at a controlled rate of speed. Feeding means extends into the housing and has a lower end terminating above a circular path defined by the upper ends of the compartments whereby material fed through the feeding means will flow into a compartment disposed therebelow. An opening is formed in the bottom wall portion and displaced from the feeding means so that material fed through the feeding means will fall into successive compartments as the impeller is rotated with the material being carried sequentially by the compartments to a position over the bottom opening whereby the material will be discharged through the opening at a controlled rate. The abrasive material is carried by the compartments so that there is no relative movement between the material and the impeller and the material does not contact the housing. Additionally, the shaft drive components of the impeller remain out of contact with the abrasive material.

DETAILED DESCRIPTION OF THE PREFERRED EMBODIMENT

Figure 1:
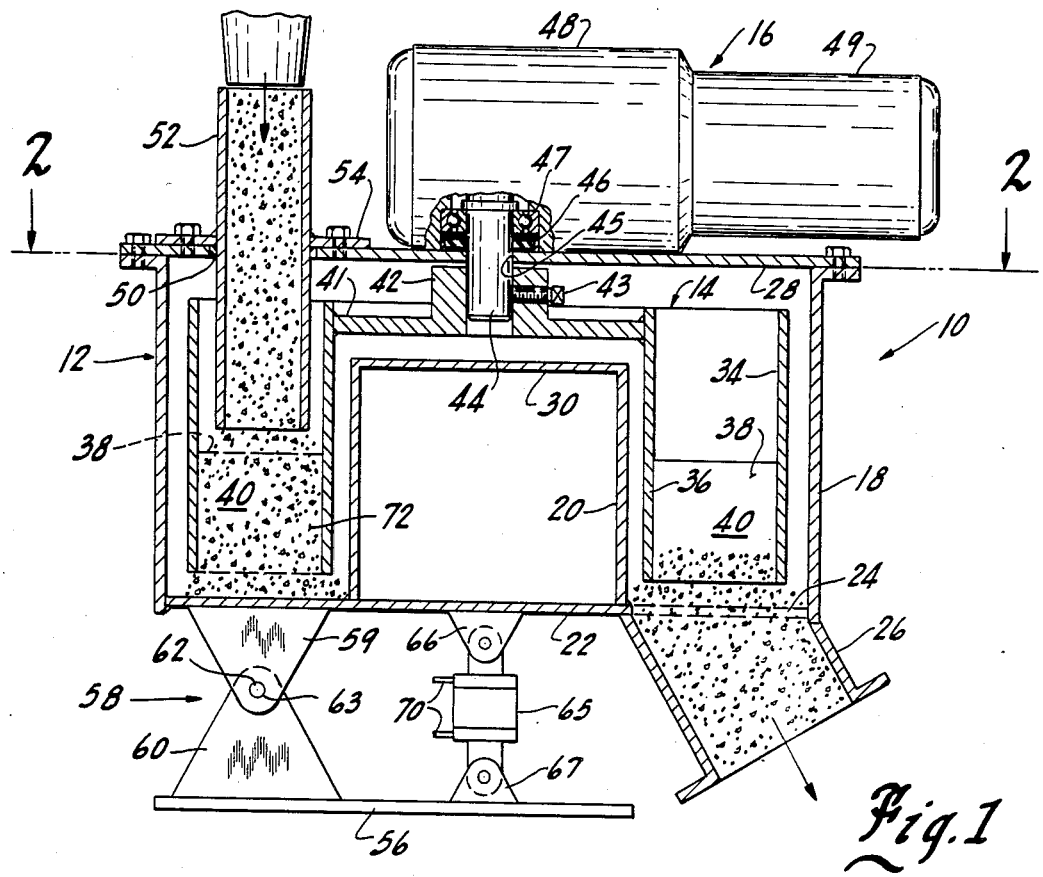
FIG. 1 is side elevational view, partly in section schematically illustrating the preferred embodiment of the invention.
Figure 2:
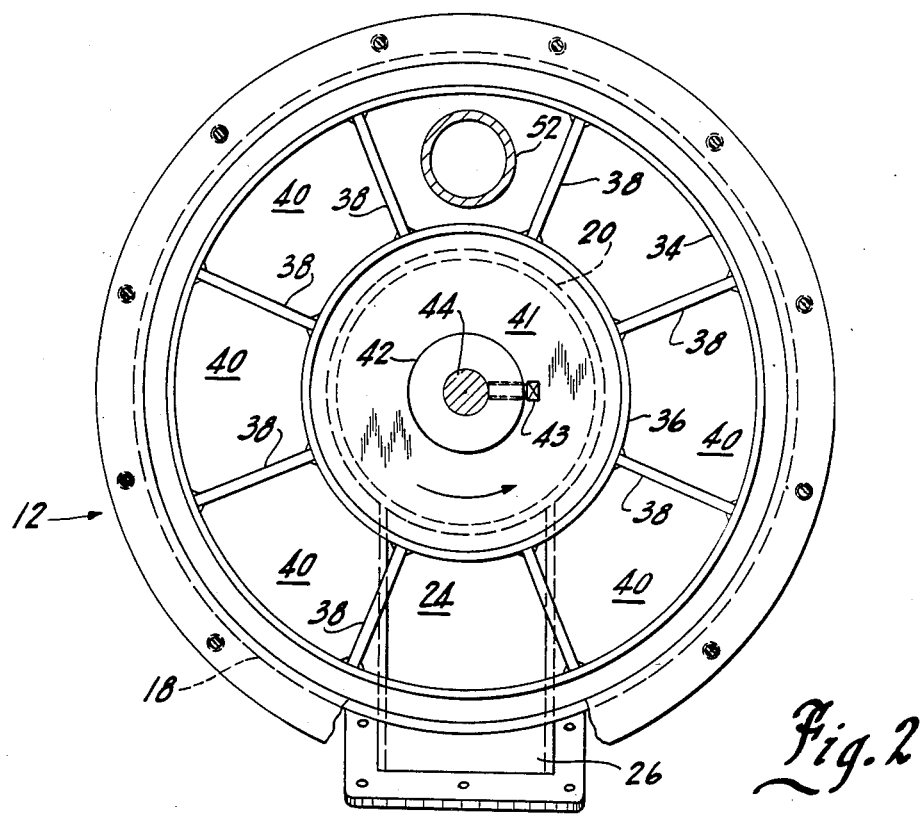
FIG. 2 is a view taken along lines 2—2 of FIG. 1.

The feeder 10 according to the preferred embodiment of the invention is shown in the drawings to include a feeder housing 12, an impeller 14 rotatably mounted within housing 12 and a drive 16 for rotating the impeller at a speed governed by the desired feed rate.

The housing 12 includes a cylindrical, vertrically oriented outer wall portion 18 and a cylindrical, vertically oriented inner wall portion 20 which is spaced from and concentric with respect to the outer wall portion 18. The lower edges of the wall portions 18 and 20 are coplanar and closed by a common bottom plate 22 except for an opening 24 in one side of plate 22 and between the wall portions 18 and 20. A discharge chute 26 is fixed to bottom plate 22 in surrounding relation to opening 24 and extends downwardly and laterally outwardly therefrom. The outer wall portion 18 is also closed by a top plate 28. The inner wall portion 20 is shorter than the outer wall portion 18 and is closed by a top plate 30 so that a gap exists between the plates 28 and 30.

The impeller 14 is generally annular and is disposed in the gap between the wall portions 18 and 20 and the plates 28 and 30. In particular, impeller 14 includes a first, hollow, open-ended cylindrical member 34 disposed coaxially with respect to the wall portions 18 and 20 and having a diameter and height slightly smaller than that of wall portion 18. In addition, a second smaller diameter cylindrical member 36 is disposed concentrically within the cylindrical member 34. As seen in FIG. 1, the members 34 and 36 are of equal height and their upper and lower ends lie in respective parallel planes. A plurality of equi-spaced, generally rectangulary shaped, radially extending fins 38 extend between and join the members 34 and 36. The fins 38 extend upwardly from the lower edges of the members 34 and 36 and are coequal in height but shorter than the members 34 and 36 define a plurality of compartments 40 which are equal in volume.

A circular top plate 41 is fixed to the upper edge of member 36 and has an axial hub 42 which is securred in any suitable manner, such as by a set screw 43, to a shaft 44 extending downwardly through an opening 45 in the plate 28 and from the drive 16. A seal 46 surrounds opening 45 and the shaft 44 is supported in a bearing 47. The impeller is thus supported by the shaft 44 so that the lower edges of the cyindrical members 34 and 36 are positioned in close proximity to, but spaced a short distance above, the bottom plate 22. While any conventional variable speed drive may be employed, in the illustrated embodiment the drive includes a variable speed motor 49 and a gear reduction unit 48 from which the shaft 44 extends.

The top plate 28 has an opening 50 disposed above the gap between cylindrical members 34 and 36 and on the side of housing 12 opposite to the discharge chute 26. A feed spout 52 extends through opening 50 and has its lower edge positioned a short distance above the plane containing the upper edges of the fins 38. A flange 54 extends radially outwardly from spout 52 and is suitably secured to plate 28 for supporting the spout 52 and sealing the opening 50.

The feeder 10 is mounted on a support plate 56 by means of a pivot base 58 which includes a first pivot member 59 secured to the lower surface of bottom plate 22 and a second pivot member 60 secured to the support plate 56. The members 59 and 60 are joined by a pivot pin 62 whose axis 63 is perpendicular to the axis of spout 52. In addition a strain guage 65 is positioned along the axis of the shaft 44 and is connected at its opposite ends by a first pivot 66 to the plate 22 and by a second pivot 67 to the support plate 56. Strain gauge 65 may be connected by conductors 70 to any suitable indicating device so that the weight of material 72 in the feeder 10 can be determined.

In operation, the motor 49 is energized to rotate the impeller 14 at a controlled rate of speed. Material 72, such as alumina, is fed downwardly through the spout 52 and into successive compartments 40 passing therebelow as the rotor 14 rotates. The amount of material 72 that is deposited in each successive compartment 40 depends upon the rate at which material is fed through the spout 52 and the rate at which the impeller 14 is rotated. Normally the material 72 is fed through spout 52 at a constant rate and the feed rate of the system is regulated by controlling the motor speed.

As each successive compartment 40 is moved around the housing 10, it will pass from a position beneath the spout 52 to a position above the opening 24 at which time the material 72 is discharge downwardly through the spout 26. Because of clearance between the rotor 14 and the bottom plate 22, a layer of the material 72 will collect on plate 22.

It can be seen that the shaft 44, the seal 46 and the bearing 47 are all located above and spaced from the compartments 40 in the lower end of the housing. As a result, the shaft 44 , the seal 46 and the bearing 47 are substantially free of contact by the highly abrasive material 72. In addition, because the material 72 is carried in the compartments 40 as the impeller 14 rotates, there is little relative motion between the material and the impeller 14 or the housing 12. Also, the layer of material 72 on the plate 22 isolates the material carried by the compartment 40 from the plate 22. As a result, wear on these components is also minimized.

Additionally, because of positive displacement of the material in a well defined cavity 40, the rate at which the material is fed from the chute 26 can be accurately controlled by controlling the rate at which the impeller 14 rotates.

While only a single embodiment of the invention has been illustrated and described, it is not intended to be limited thereby but only by the scope of the appended claims.

I claim:

1. A feeder including an annular housing, an annular impeller disposed within said housing, said impeller including spaced apart concentric cylindrical members,
   a plurality of fin members disposed in equi-spaced relation and extending between said cylindrical members to define a plurality of compartments of equal capacity within said impeller,
   said fin members extending upwardly from the lower edges of the cylindrical members and having a height substantially less than that of the cylindrical members, a feed spout extending downwardly through said housing and into the space between said cylindrical members and terminating in proximity to the upper edges of said fin members, hub means adjacent the upper end of said impeller and above the lower end of said spout, shaft means extending downwardly through said housing and engaging said hub means for rotating said impeller, said housing having a lower wall portion, an opening formed in said lower wall portion and below said impeller, said opening being spaced from said feed chute.

2. The feeder set forth in claim 1 wherein said housing includes a top plate having an axial opening therein, said shaft means extending downwardly through said opening, sealing means around said opening, and bearing means for said shaft means being disposed above said top plate.

3. A feeder for highly abrasive material including a housing having upper and lower wall portions, an impeller disposed within said housing, said impeller being mounted for rotation about a vertical axis and including partition means defining a plurality of compartments of equal volume and disposed in an equi-angular circular array, said compartments being disposed adjacent the lower wall portion of said housing and being open at their upper and lower ends, said impeller including an upper portion disposed above said compartments and adjacent the upper wall portion, shaft means engaging the upper portion of the impeller, drive means disposed above the impeller and being coupled to said shaft means for rotating said impeller at a controlled rate of speed so that the upper and lower ends of said compartments move in spaced apart circular paths, feeding means extending into said housing and having a lower discharge end spaced from the rotational axis of the impeller and terminating proximate to and above the circular path of the upper ends of the compartments as the impeller rotates so that material fed through said feeding means will sequentially flow directly into a compartment as the impeller rotates therebelow, an opening formed in the lower wall portion and displaced from said feeding means and below the path of the lower ends of the compartments so that material fed through said feeding means will fall directly from the feeding means into successive compartments as the impeller is rotated and the same will be carried sequentially by said compartments to a position over the opening in the bottom wall portion whereby the material will be discharged through the opening at a controlled rate, said abrasive material being carried by said compartment so that there is little relative movement between said material and said impeller and said material does not contact said housing.

4. The feeder set forth in claim 3 wherein drive means is disposed above said upper wall portion and said shaft means extends through an opening in the upper wall portion, sealing means disposed externally of said housing and around said opening and bearing means disposed above said upper wall portion whereby said shaft said seal and said bearing are disposed above and displaced from the material being carried by each compartment, said impeller being unsupported at its lower end.

5. The feeder set forth in claim 3 wherein said compartment defining means is generally annular, each of said compartments being displaced radially from and below the shaft means, and inner and outer wall means extending upwardly from said compartments and defining an annular gap, said feeding means extending into said gap.

6. The feeder set forth in claim 3 wherein said drive means includes a variable speed motor.

7. The feeder set forth in claim 3 wherein the lower ends of said compartments are disposed above said lower wall portion whereby the material carried by said compartments will not abrade said lower wall portion or said housing.

8. The feeder set forth in claim 7 wherein said compartment defining means is generally annular, each of said compartments being displaced radially from and below the shaft means 9. The feeder set forth in claim 8 wherein said drive means includes a variable speed motor.

10. The feeder set forth in claim 9 wherein said drive means is disposed above said upper wall portion and shaft means extends through an opening in the upper wall portion, sealing means disposed around said opening and bearing means disposed above said upper wall portion whereby said shaft said seal and said bearing are disposed above and displaced from the material being carried by each compartment, said impeller being unsupported at its lower end.

11. A feeder for highly abrasive materials including a housing, an impeller disposed within said housing, said impeller including an outer wall portion and partition means coupled to said outer wall means and defining therewith an annular array of equal capacity compartments which are equiradially spaced relative to the axis of said outer housing, said outer wall portion extending upwardly from said compartments and in a surrounding relation thereto, said compartments being open at their upper and lower ends, hub means mounted on said impeller adjacent its upper end and above the lower end of a feed spout, shaft means extending downwardly into said housing and engaging said hub means, drive means engaging said shaft means for rotating said impeller to rotate the upper and lower ends of said compartments in a circular path, said feed spout extending downwardly through said housing and into said outer wall portion and terminating in close proximity to the path defined by the upper ends of said compartments, said housing having a lower wall portion, an opening formed in said lower wall portion and spaced from said feed spout, said opening lying below the path defined by the lower ends of said compartments.

12. The feeder set forth in claim 11 wherein said drive means includes a variable speed motor.

13. The feeder set forth in claim 11 wherein the lower ends of said compartments are disposed above said lower wall portion whereby the material carried by said compartments will not abrade said lower wall portion of said housing.

14. The feeder set forth in claim 11 and including inner and outer concentric wall means surrounding said compartments and extending upwardly therefrom said feeding means extending downwardly between said wall means.

15. The feeder set forth in claim 14 wherein said drive means is disposed on the exterior of said housing.

* * * * *